United States Patent
Kano et al.

(10) Patent No.: US 11,557,159 B2
(45) Date of Patent: Jan. 17, 2023

(54) INFORMATION PROCESSING APPARATUS, INFORMATION PROCESSING SYSTEM, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Hirokazu Kano, Nagoya (JP); Masatoshi Hayashi, Nisshin (JP); Reita Kamei, Nagoya (JP); Namika Hara, Kameyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/226,795

(22) Filed: Apr. 9, 2021

(65) Prior Publication Data
US 2021/0319638 A1 Oct. 14, 2021

(30) Foreign Application Priority Data

Apr. 14, 2020 (JP) .............................. JP2020-072229

(51) Int. Cl.
| G07C 9/00 | (2020.01) |
| G07C 9/27 | (2020.01) |
| G07C 9/28 | (2020.01) |
| H04L 67/10 | (2022.01) |
| H04L 9/40 | (2022.01) |

(52) U.S. Cl.
CPC ............ *G07C 9/00182* (2013.01); *G07C 9/27* (2020.01); *G07C 9/28* (2020.01); *H04L 63/08* (2013.01); *H04L 67/10* (2013.01); *G07C 2009/00198* (2013.01); *G07C 2009/00769* (2013.01); *G07C 2209/62* (2013.01)

(58) Field of Classification Search
CPC ........ G07C 9/00182; G07C 9/27; G07C 9/28; G07C 2009/00198; G07C 2009/00769; H04L 63/08; H04L 67/10
See application file for complete search history.

(56) References Cited

U.S. PATENT DOCUMENTS 11,295,563 B2 * 4/2022 Kuenzi .............. G07C 9/00309

FOREIGN PATENT DOCUMENTS

WO 2019/163194 A1 8/2019

* cited by examiner

*Primary Examiner* — Daniell L Negron
(74) *Attorney, Agent, or Firm* — Sughrue Mion, PLLC

(57) ABSTRACT

An information processing apparatus including a control unit configured to perform obtaining result data indicating a result of locking and unlocking performed by a locking and unlocking device that performs locking and unlocking based on authentication information obtained from a portable terminal carried by a user, and generating, based on the result data, proposal data including a proposal for a service to be provided to the user.

11 Claims, 10 Drawing Sheets

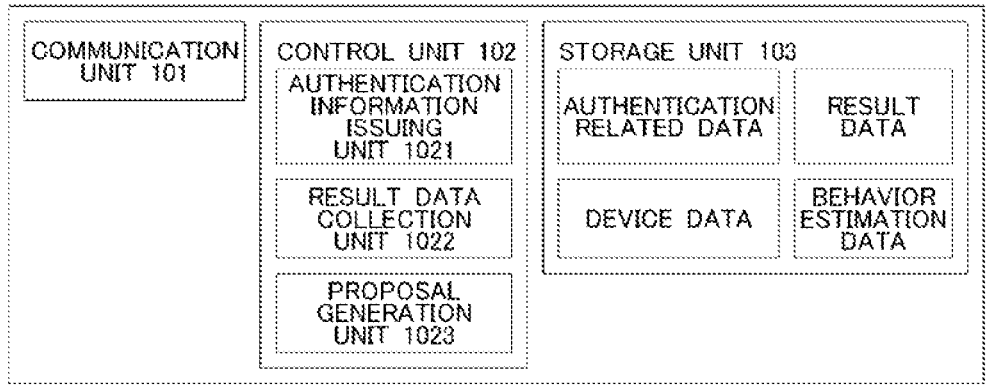
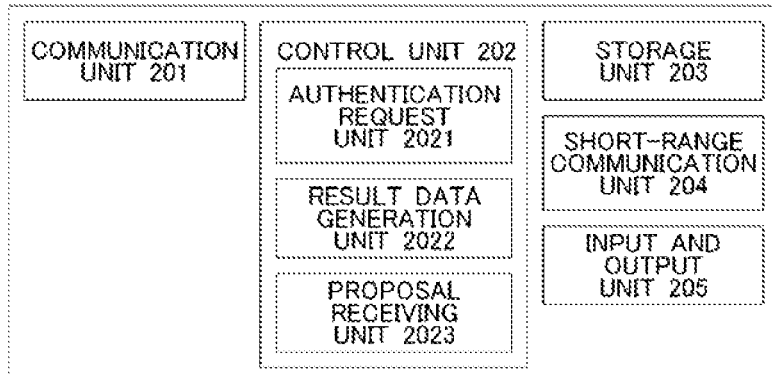
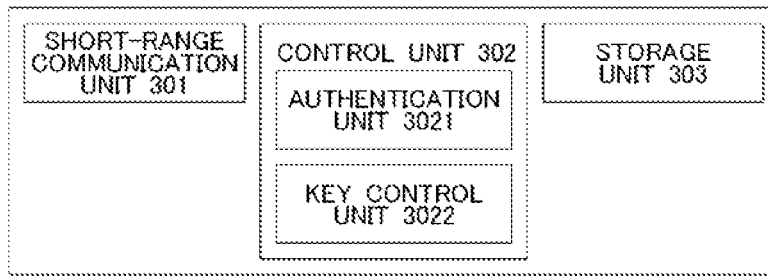
Fig. 2

DEVICE DATA

| USER ID | LOCKING AND UNLOCKING DEVICE ID | PLACE |
|---|---|---|
| U001 | L001 | POINT A | HOME ENTRANCE
| U001 | L002 | (UNFIXED) | CAR
| U001 | L003 | POINT B | WORKPLACE ENTRANCE
| U001 | L004 | POINT C | HOME DELIVERY LOCKER
| U002 | L005 | ・・・ |

Fig. 3

RESULT DATA

| DATE AND TIME | USER ID | LOCKING AND UNLOCKING DEVICE ID | ACTION |
|---|---|---|---|
| · · · | U001 | POINT A | LOCKING |
| · · · | U001 | POINT A | UNLOCKING |
| · · · | U001 | POINT B | LOCKING |
| · · · | U001 | POINT B | UNLOCKING |
| · · · | U001 | · · · | · · · |
| | | | |

Fig. 4

BEHAVIOR ESTIMATION DATA

| TIME FRAME | PLACE | ACTION | BEHAVIOR | REMARKS |
|---|---|---|---|---|
| WEEKDAY MORNING | POINT A (HOME) | LOCKING | COMMUTING (OUTWARD) | ABSENT FROM HOME FOR 8 HOURS OR MORE |
| WEEKDAY MORNING | POINT B (WORKPLACE) | UNLOCKING | SERVICE START | ABSENT FROM HOME FOR 8 HOURS OR MORE |
| WEEKDAY NIGHT | POINT B (WORKPLACE) | LOCKING | COMMUTING (RETURN) | RETURN HOME WITHIN 1 HOUR |
| WEEKDAY NIGHT | POINT A (HOME) | UNLOCKING | RETURN HOME | NOT GO OUT DURING THE SAME DAY |
| ... | ... | ... | ... | ... |
|  |  |  |  |  |

Fig. 5

INFORMATION PROCESSING APPARATUS, INFORMATION PROCESSING SYSTEM, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-072229, filed on Apr. 14, 2020, which is hereby incorporated by reference herein in its entirety.

BACKGROUND

Technical Field

The present invention relates to a technology for providing services to users.

Description of the Related Art

There are attempts to provide various services in conjunction with the movement of a user. For example, Patent Literature 1 discloses a system that determines a period of time in which a user does not use an automatic driving vehicle, and provides another service by the autonomous driving vehicle in such a period of time.

CITATION LIST

Patent Literature

Patent Literature 1: PCT International Publication No. 2019/163194

SUMMARY

According to the system described in Patent Literature 1, the vehicle can be effectively utilized. On the other hand, a technology for providing services to a user himself or herself in relation to the movement of the user has not been widespread.

The present invention has been made in view of the above problems, and an object of the present invention is to propose various services to a user in conjunction with the movement of the user.

An information processing apparatus according to a first aspect of the present disclosure is characterized by including a control unit configured to perform: obtaining result data indicating a result of locking and unlocking performed by a locking and unlocking device that performs locking and unlocking based on authentication information obtained from a portable terminal carried by a user; and generating, based on the result data, proposal data including a proposal for a service to be provided to the user.

In addition, an information processing system according to a second aspect of the present disclosure is characterized by comprising: a portable terminal configured to communicate with a locking and unlocking device that performs locking and unlocking based on authentication information; and a sever device; wherein the portable terminal includes a first control unit configured to perform: requesting the locking and unlocking device to perform locking and unlocking according to the authentication information obtained from the server device; and transmitting result data indicating a result of the locking and unlocking to the server device; and the server device includes a second control unit configured to perform: transmitting the authentication information corresponding to the locking and unlocking device to the portable terminal, and generating, based on the result data, proposal data including a proposal for a service to be provided to a user who carries the portable terminal.

Moreover, an information processing method according to a third aspect of the present disclosure is characterized by comprising: a step of obtaining result data indicating a result of locking and unlocking performed by a locking and unlocking device that performs locking and unlocking based on authentication information obtained from a portable terminal carried by a user; and a step of generating, based on the result data, proposal data including a proposal for a service to be provided to the user.

Further, as another aspect of the present disclosure, there can be mentioned a program for causing a computer to perform the above-described information processing method, or a computer readable storage medium storing the program in a non-transitory manner.

According to the present invention, various services can be proposed to a user in conjunction with the movement of the user.

BRIEF DESCRIPTION OF THE DRAWINGS

FIG. 2 is a block diagram schematically illustrating an example of components included in the system;

FIG. 3 is a diagram illustrating an example of device data;

FIG. 4 is a diagram illustrating an example of result data;

FIG. 5 is a diagram illustrating an example of behavior estimation data;

DESCRIPTION OF THE EMBODIMENTS

Figure 1:
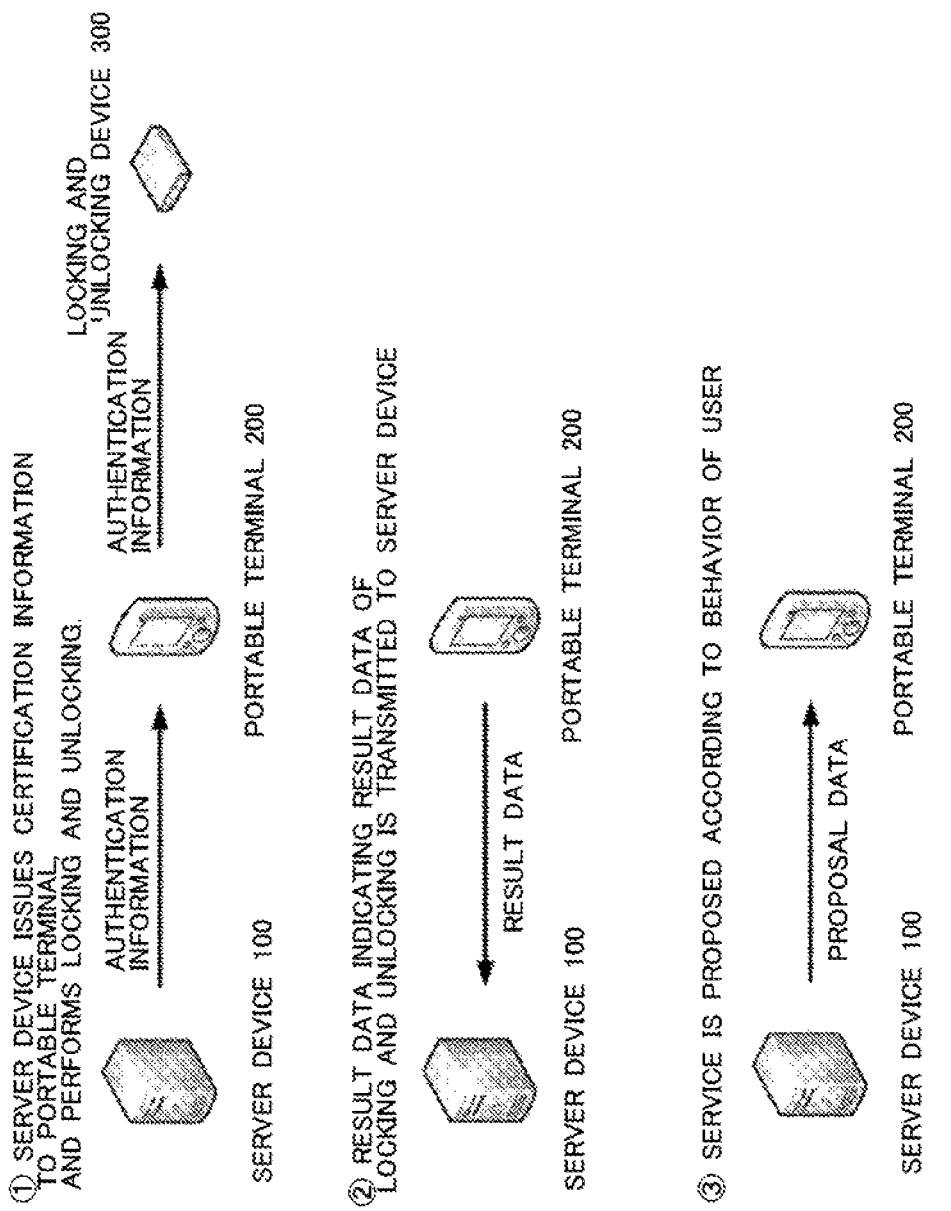
FIG. 1 is a schematic diagram of an information processing system according to a first embodiment of the present invention.

An information processing apparatus according to the present embodiments is an apparatus used in a system in which a key is locked and unlocked by a portable terminal.

Specifically, the information processing apparatus is characterized by including a control unit that is configured to perform: obtaining result data indicating a result of locking and unlocking performed by one or more locking and unlocking devices that perform locking and unlocking based on authentication information obtained from a portable terminal (hereinafter, also referred to as a user terminal) carried by a user; and generating, based on the result data, proposal data including a proposal for a service to be provided to the user.

Each locking and unlocking device in the present embodiment is a device that performs locking and unlocking based on the authentication information electronically obtained from the user terminal. Each locking and unlocking device may also be, for example, a device mounted on a vehicle, or a device provided at an entrance of a building. In addition, it may also be a device provided in a locker or the like. For example, a smart phone can be used instead of the key, by locking and unlocking an electronic lock based on the authentication information obtained from the user terminal.

The result data is data indicating the result of locking and unlocking performed by each locking and unlocking device (e.g., the fact of unlocking or the fact of locking). The result data may be obtained from the user terminal, or may be obtained from each locking and unlocking device. In addition, the result data may include date and time information.

The control unit generates, based on the result data, proposal data including a proposal for a service to be provided to the user.

Based on the result data, it can be determined that the user has gone out of his or her home, has got in a vehicle, has arrived at a destination, and the like. Further, the location of the user can be estimated based on information (location information or the like) of each locking and unlocking device. That is, it is possible to propose an appropriate service according to the state (e.g., the location) of the user.

In addition, the control unit may be characterized by obtaining the result data for each of the locking and unlocking devices installed at a plurality of locations.

Therefore, the user terminal may include information for identifying each of the locking and unlocking devices installed at the plurality of locations in the result data.

According to such a configuration, it is possible to determine to which of the plurality of locking and unlocking devices under management the user has performed an action.

Moreover, the control unit may be characterized by transmitting authentication information corresponding to each of the locking and unlocking devices to the user terminal.

Further, the result data may be characterized by being generated by the portable terminal in cases where the authentication information is used.

Whether the authentication information has been used may be determined based on information obtained from the user terminal, or may be determined based on information obtained from each locking and unlocking device. For example, the user terminal may transmit the result data in cases where the authentication information is accepted by each locking and unlocking device.

Furthermore, the control unit may be characterized by determining, based on the result data, whether the user is at home, and then deciding a content of the proposal based on a result of the determination.

For example, in cases where the user is at home, the user is able to receive a home delivery service, and hence, a service of "notifying a delivery company to that effect" can be proposed. On the other hand, in cases where the user is not at home, a service such as housekeeping or the like can be proposed to the user.

Still further, the information processing apparatus may be characterized by further including a storage unit configured to store information on geographical locations of a plurality of the locking and unlocking devices, and the control unit may be characterized by estimating a current location of the user based on the geographical locations of the plurality of locking and unlocking devices, and deciding the content of the proposal according to the current location of the user.

According to such a configuration, for example, it is possible to estimate the time required for the user to return home, thereby making it possible to propose a more appropriate service.

In addition, the control unit may be characterized by predicting future behavior of the user based on the result data that has been accumulated.

For example, in cases where the user takes similar behavior on a daily basis, it becomes possible to estimate the subsequent behavior of the user based on the result data generated at a certain point in time. This makes it possible to propose a service in a proactive manner.

Moreover, the control unit may be characterized by estimating, based on the behavior of the user thus predicted, a time frame in which the user is at home, and deciding the content of the proposal based on the time frame thus estimated.

According to such a configuration, it is possible to automatically estimate a time frame suitable for receiving a home delivery service, for example.

Hereinafter, embodiments of the present disclosure will be described based on the accompanying drawings. The configurations of the following embodiments are examples, and the present disclosure is not limited to the configurations of the embodiments.

First Embodiment

An overview of an information processing system according to a first embodiment will be described with reference to FIG. 1. The system according to the present embodiment is configured to include one or more locking and unlocking devices 300 installed in equipment (e.g., a house, a facility, a building, a vehicle, or the like) used by a user, a portable terminal 200 carried by the user, and a server device 100.

In the system according to the present embodiment, the portable terminal 200 obtains data (authentication information) for making authentication from the server device 100. In addition, each locking and unlocking device 300 authenticates the portable terminal 200 by radio or wireless communication, and locks or unlocks an electronic lock when the authentication is successful. Thus, the user can lock and unlock a target equipment or the like only with the portable terminal 200 without using a physical key.

When the authentication is successful and a locking and unlocking device 300 performs locking and unlocking, result data indicating a result of the locking and unlocking is transmitted from the portable terminal 200 to the server device 100.

The server device 100 estimates, based on the result data received from the portable terminal 200, the behavior of the user who carries the portable terminal 200, and proposes a service to the user based on the estimated behavior. Accordingly, for example, in cases where it is estimated that "the user is going to home after leaving a workplace", it is possible to propose a service of designating a delivery time frame of a package so that the home delivery service thereof arrives after the time when the user arrives at home.

The components of the system will be described in detail. FIG. 2 is a block diagram schematically illustrating an example of the configurations of the server device 100, the portable terminal 200, and the locking and unlocking device 300 as illustrated in FIG. 1.

The locking and unlocking device 300 is a device for locking and unlocking a door of a predetermined equipment, facility, building or the like, and is a device constituting a part of a smart key system.

The locking and unlocking device 300 has a function of authenticating the portable terminal 200 by performing short-range wireless communication with the portable terminal 200, and a function of locking and unlocking the electronic lock based on a result of authenticating the portable terminal 200. The locking and unlocking device 300 is composed of including a short-range communication unit 301, a control unit 302, and a storage unit 303.

The short-range communication unit 301 is an interface for performing short-range wireless communication with the portable terminal 200. The short-range communication unit 301 performs communication in a short range (about several centimeters) using a predetermined wireless communication standard.

In the present embodiment, the short-range communication unit 301 performs data communication according to a Bluetooth (registered trademark) Low Energy standard (hereinafter referred to as BLE). Here, note that the BLE is exemplified in the present embodiment, but other wireless communication standards can also be used. For example, NFC (Near Field Communication), UWB (Ultra Wideband). Wi-Fi (registered trademark), or the like may be used.

The control unit 302 is a module that performs short-range wireless communication with the portable terminal 200 via the short-range communication unit 301, performs control for authenticating the portable terminal 200, and performs control for locking and unlocking the electronic lock based on the authentication result. The control unit 302 is composed of, for example, a microcomputer.

The control unit 302 includes an authentication unit 3021 and a key control unit 3022 as functional modules. Each functional module may be realized by executing a program stored in a storage unit (ROM or the like) by a CPU.

The authentication unit 3021 authenticates the portable terminal 200 based on the authentication information transmitted from the portable terminal 200. Specifically, the authentication information stored in the storage unit 303 and the authentication information transmitted from the portable terminal 200 are compared with each other, and when they match with each other, it is determined that the authentication is successful. When both the pieces of authentication information do not match with each other, it is determined that the authentication is unsuccessful. When the authentication unit 3021 succeeds in the authentication of the portable terminal 200, a command for locking and unlocking is transmitted to the key control unit 3022 that will be described later.

Here, note that a method of authentication performed by the authentication unit 3021 may be a method that simply compares the authentication information with each other to verify the identity, or it may be a method that uses asymmetric encryption.

Hereinafter, the authentication information stored in the locking and unlocking device 300 is referred to as device authentication information, and the authentication information transmitted from the portable terminal 200 is referred to as terminal authentication information, as needed for description.

The key control unit 3022 controls the electronic lock (latch) based on the command transmitted from the authentication unit 3021.

The storage unit 303 is a means or unit for storing information, and is composed of a storage medium such as a RAM, a magnetic disk, a flash memory or the like. The storage unit 303 stores the device authentication information to be compared with the terminal authentication information transmitted from the portable terminal 200, various kinds of programs to be performed by the control unit 302, data, and the like.

Next, the portable terminal 200 will be described.

The portable terminal 200 is a small computer such as, for example, a smart phone, a mobile phone, a tablet terminal, a personal information terminal, or a wearable computer (a smart watch or the like). The portable terminal 200 is composed of including a communication unit 201, a control unit 202, a storage unit 203, a short-range communication unit 204, and an input and output unit 205.

The communication unit 201 is a communication means for connecting the portable terminal 200 to a network. In the present embodiment, the portable terminal 200 is able to perform communication with other devices (e.g., the server device 100) via a network by making use of a mobile communication service such as 4G, LTE or the like.

The control unit 202 is a means or unit that controls the portable terminal 200. The control unit 202 is composed of, for example, a microcomputer. The control unit 202 may realize these functions by executing a program(s) stored in the storage unit 203 to be described later by means of a CPU.

The control unit 202 includes, as functional modules, an authentication request unit 2021, a result data generation unit 2022, and a proposal receiving unit 2023. Each of these functional modules may be realized by executing a program(s) stored in a storage unit (ROM or the like) by means of the CPU.

The authentication request unit 2021 performs the processing of obtaining the terminal authentication information from the server device 100, and the processing of requesting locking and unlocking by communicating with the locking and unlocking device 300.

The authentication request unit 2021 firstly performs the process of obtaining the terminal authentication information. In the present embodiment, the terminal authentication information is generated in the server device 100, and is transmitted to the portable terminal 200 via the communication unit 201.

The authentication request unit 2021 secondly provides an operation screen to the user via the input and output unit 205 to be described later, and generates a request for locking or unlocking based on an operation performed by the user. For example, the authentication request unit 2021 outputs an icon for unlocking, an icon for locking, or the like to a touch panel display, and generates data (a locking and unlocking request) for requesting locking or unlocking based on the operation performed by the user.

Here, note that the operation performed by the user is not limited to an operation performed via the touch panel display. For example, it may be via a hardware switch or the like.

Here, note that in cases where the portable terminal 200 does not have the terminal authentication information, a locking operation and an unlocking operation cannot be performed from the operation screen.

The terminal authentication information obtained by the portable terminal 200 may be an immutable key or a one-time key. In any case, the device authentication information corresponding to the terminal authentication information has been stored in advance in the locking and unlocking device 300.

When the authentication information is accepted by the locking and unlocking device 300 and locking and unlocking are performed, the result data generation unit 2022 performs the process of generating data (result data) indicating the result of the locking and unlocking and transmitting the data to the server device 100.

The proposal receiving unit 2023 performs the processing of receiving a proposal related to a service transmitted from the server device 100 and providing the proposal to the user.

The storage unit 203 is means or unit for storing information, and is composed of a storage medium such as a RAM, a magnetic disk, a flash memory or the like. The storage unit 203 stores the terminal authentication information transmitted from the server device 100, the result data generated by the result data generation unit 2022, and various kinds of programs performed by the control unit 202, data, and the like.

The short-range communication unit 204 is a means or unit for communicating with the locking and unlocking device 300 by the same communication standard as that of the short-range communication unit 301.

The input and output unit 205 is a means or unit for accepting an input operation performed by the user and presenting information to the user. Specifically, it is composed of a touch panel with its control unit, and a liquid crystal display with its control unit. In the present embodiment, the touch panel and the liquid crystal display are formed of a single touch panel display.

Next, the server device 100 will be described.

The server device 100 performs the processing of issuing terminal authentication information in response to a request from the portable terminal 200, and the processing of proposing a service to the user based on the result of locking and unlocking. The server device 100 is composed of including a communication unit 101, a control unit 102, and a storage unit 103.

Similar to the communication unit 201, the communication unit 101 is a communication interface for communicating with the portable terminal 200 via a network.

The control unit 102 is a means or unit for controlling the server device 100. The control unit 102 is composed of, for example, a CPU.

The control unit 102 includes, as functional modules, an authentication information issuing unit 1021, a result data collection unit 1022, and a proposal generation unit 1023. Each of the functional modules may be realized by executing a program(s) stored in a storage unit such as a ROM or the like by means of a CPU.

The authentication information issuing unit 1021 issues terminal authentication information in response to a request from the portable terminal 200. As described above, the terminal authentication information is data that is used for the portable terminal 200 to be authenticated by the locking and unlocking device 300.

The authentication information issuing unit 1021 issues the terminal authentication information corresponding to the portable terminal 200 when receiving an issue request for the terminal authentication information from the portable terminal 200. The terminal authentication information may be obtained which has been stored in advance, or may be dynamically generated. For example, it is possible to generate authentication information that is valid only in a predetermined time frame, authentication information in which the number of times of use is designated, authentication information that can be used only in a predetermined portable terminal, or the like. Here, note that the terminal authentication information may be one that is valid only for a specific combination of a portable terminal 200 and a locking and unlocking device 300.

The result data collection unit 1022 collects result data from the portable terminal 200.

The proposal generation unit 1023 generates information on a service to be proposed to the user based on the collected result data.

The storage unit 103 is a means or unit for storing information, and is composed of a storage medium such as a RAM, a magnetic disk, a flash memory or the like. The storage unit 103 stores various types of data (authentication related data) for generating terminal authentication information.

In the present embodiment, the storage unit 103 stores authentication related data, device data, result data, and behavior estimation data.

Each of the above data will be described.

The device data is data related to the locking and unlocking device 300 under the management of the server device 100. FIG. 3 is an example of the device data.

In the present example, an identifier of the user who carries the portable terminal 200, an identifier of the locking and unlocking device 300 that can be accessed by the user, and information (e.g., latitude and longitude, and information for identifying a geographical location) related to a place where the locking and unlocking device 300 is installed are stored in association with each other.

The result data is data to be transmitted from the portable terminal 200 to the server device 100, and is data indicating the result of locking or unlocking of the locking and unlocking device 300 performed by the portable terminal 200. FIG. 4 shows an example of the result data. The result data is data in which the date and time, the identifier of the user (the portable terminal 200), the identifier of the locking and unlocking device, and the action (locking or unlocking) taken by the user are associated with each other. The processing of obtaining the result data will be described later.

The behavior estimation data is data for estimating what behavior the user who has performed an action on the locking and unlocking device 300 takes. FIG. 5 illustrates an example of the behavior estimation data.

For example, when an entrance door of a users home is locked, it can be estimated that the user starts moving from the home. For example, when there is an action of locking the user's home in the morning of a weekday, it can be estimated that the user is not at home in the following several hours.

The server device 100 determines, based on these data stored in the storage unit 103, a service that is preferably provided to the user. Details of the processing using each data will be described later.

Figure 6:
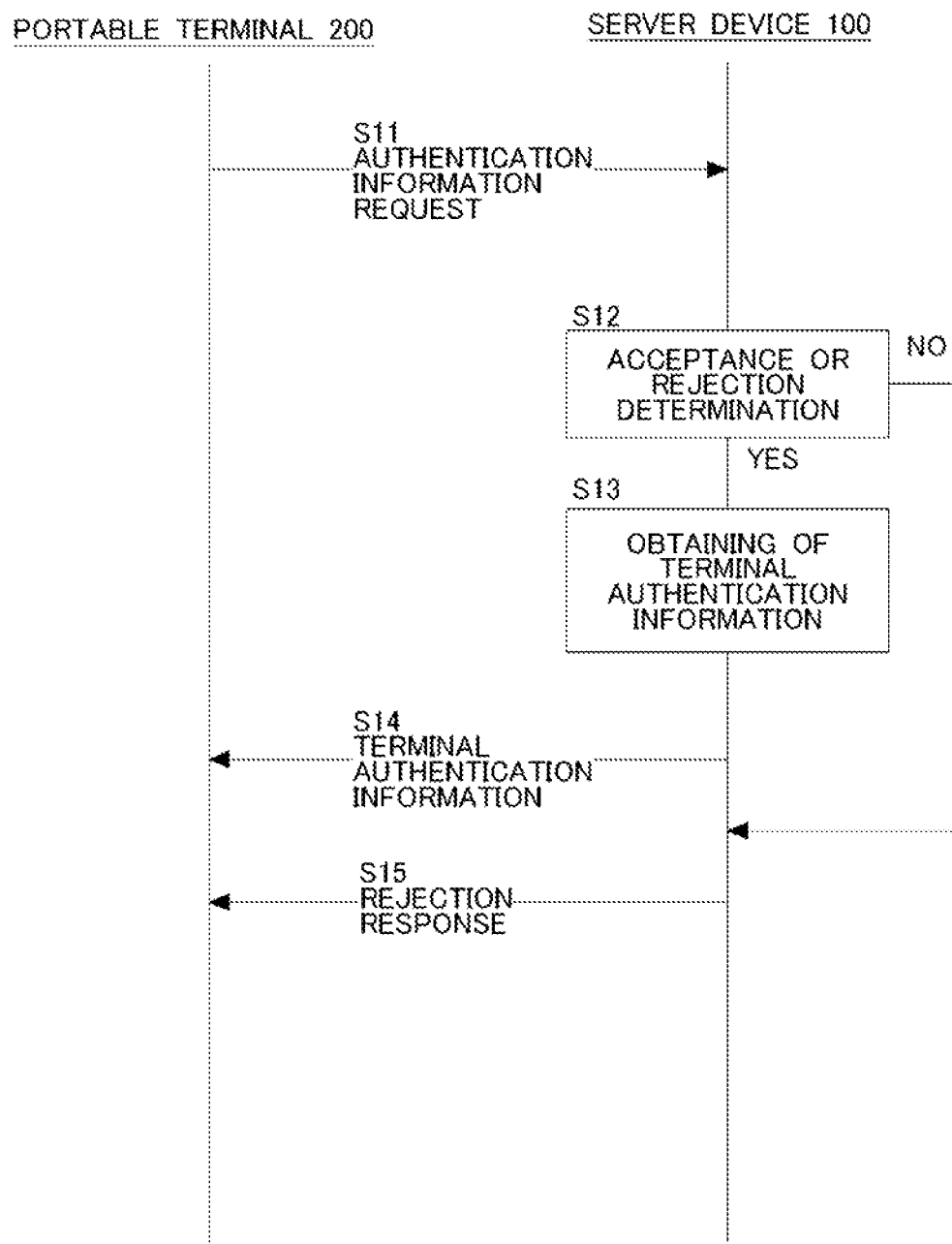
FIG. 6 is a flow diagram of data to be transmitted and received by the components of the system.
Figure 7:
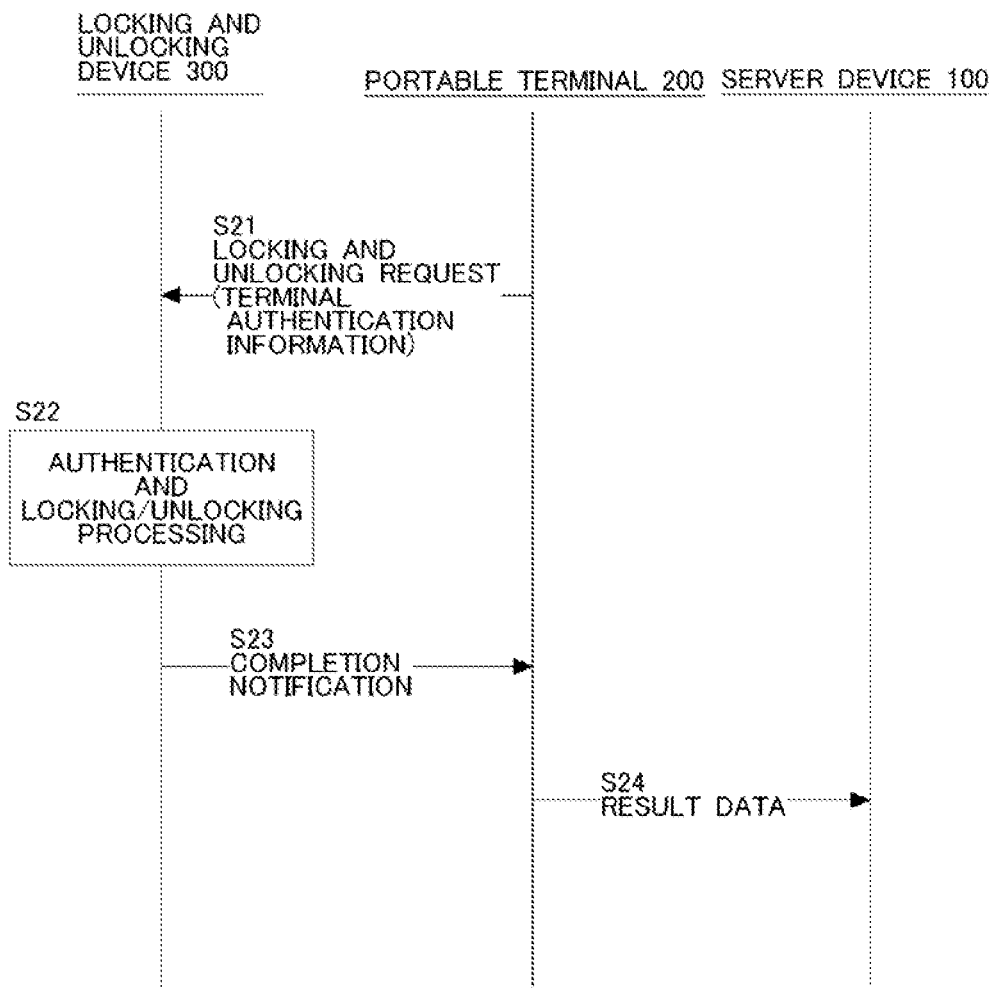
FIG. 7 is another diagram of data to be transmitted and received by the components of the system.

Next, the processing performed by the above-mentioned components will be described. The processing can be divided into a phase (first phase) in which the portable terminal 200 transmits an authentication information request to the server device 100 and obtains terminal authentication information, and a phase (second phase) in which the portable terminal 200 accesses the locking and unlocking device 300 by using the terminal authentication information and locks or unlocks the target equipment or the like. FIG. 6 is a data flow diagram in the first phase, and FIG. 7 is a data flow diagram in the second phase.

The first phase will be described with reference to FIG. 6.

First, in step S11, the portable terminal 200 transmits data (authentication information request) to the server device 100, requesting the issuance of terminal authentication information. The terminal authentication information described herein is information for the locking and unlocking device 300 to authenticate the portable terminal 200. In this step, the following information is transmitted at the same time.

(1) authentication information request,
(2) information for identifying the portable terminal 200, and
(3) data for proving the validity of the portable terminal 200.

The data for proving the validity of the portable terminal 200 may be a password, biological information, or the like. In addition, these pieces of information may be hashed.

In step S12, the server device 100 (the authentication information issuing unit 1021) determines, based on the data obtained, whether or not terminal authentication information may be issued to the portable terminal 200. Here, in cases where the determination is negative, a rejection response is returned to the portable terminal 200 (step S15).

In cases where the determination is affirmative in step S12, then in step S13, the authentication information issuing unit 1021 generates or obtains the terminal authentication information specific to the portable terminal 200, and transmits it to the portable terminal 200 (step S14). As a result, an operation of unlocking the locking and unlocking device 300 can be performed on the portable terminal 200.

Here, note that the processing of steps S11 through S15 is preparation processing for locking and unlocking, and thus, it is preferable that the processing have been done in advance.

The second phase will be described with reference to FIG. 7. Steps S21 through S24 are processing for locking and unlocking the locking and unlocking device 300 by using the portable terminal 200.

When the user of the portable terminal 200 performs an operation of accessing the locking and unlocking device 300 via the input and output unit 205, in step S21, the portable terminal 200 (authentication request unit 2021) transmits data requesting locking or unlocking (locking and unlocking request) to the locking and unlocking device 300. The locking and unlocking request includes terminal authentication information.

Then, in step S22, the locking and unlocking device 300 (the authentication unit 3021) collates the terminal authentication information transmitted from the portable terminal 200 with the device authentication information stored in advance, thereby performing authentication processing.

In cases where the authentication is successful, the key control unit 3022 included in the locking and unlocking device 300 transmits a locking signal or an unlocking signal to the electronic lock.

In addition, after transmitting the locking signal or the unlocking signal, the key control unit 3022 included in the locking and unlocking device 300 transmits a notification (completion notification) indicating that locking or unlocking is completed to the portable terminal 200 (step S23). As a result, a notification indicating that the locking or unlocking has been completed is outputted on the touch panel screen of the portable terminal 200. Here, note that in cases where the terminal authentication information is a one-time key, the one-time key may be invalidated at the timing of the step S23.

In step S24, the portable terminal 200 generates an identifier of the user, an identifier of the locking and unlocking device 300, and data indicating an action (locking or unlocking) performed on the locking and unlocking device 300, and transmits them to the server device 100. The server device (the result data collection unit 1022) stores the received result data in the storage unit 103.

Thus, the server device 100 can specify a device that has been locked or unlocked by a target user, among a plurality of locking and unlocking devices 300 under the management.

Next, processing will be described in which the server device 100 (the proposal generation unit 1023) generates a proposal to the user based on the result data that has been accumulated.

Figure 8:
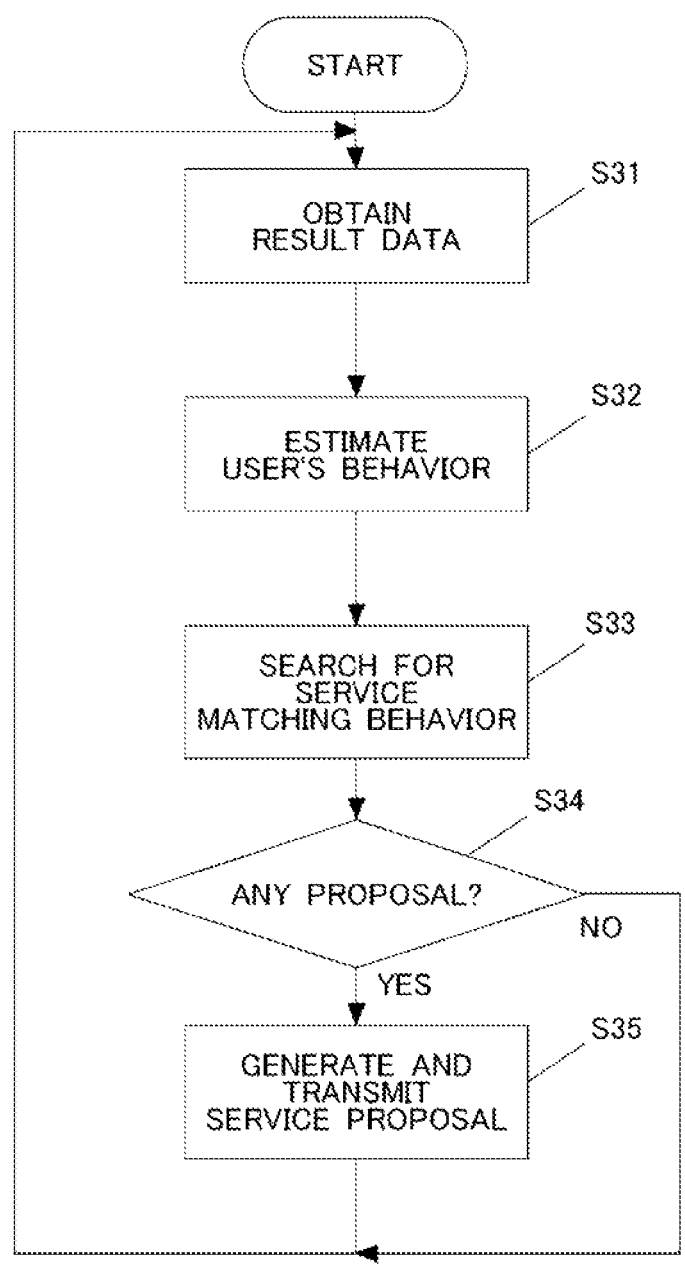
FIG. 8 is a flowchart of processing to be performed by a proposal generation unit.

FIG. 8 is a flowchart of processing performed by the proposal generation unit 1023. The processing is periodically performed in parallel with the collection of result data. Here, note that in cases where there are a plurality of target users, the processing illustrated in FIG. 8 is performed for each user.

In step S31, the result data stored in the storage unit 103 is obtained. It is preferable that the obtaining of the result data be performed for a predetermined period of time suitable for the proposal of a service, such as for example the past one hour.

Then, in step S32, the latest behavior of the user is estimated based on the result data obtained and the behavior estimation data stored. For example, in cases where the time of day (the time frame) is weekday morning and the entrance door of the user's home is locked, it can be determined that the behavior of "commuting to work (outward)" has started.

Subsequently, in step S33, it is determined whether or not there is a service that can be provided in accordance with the estimated behavior of the user.

For example, in cases where the estimated behavior is "commuting to work (outward)", it is estimated that the user will not return home until a predetermined working time has passed. In this case, it is possible to propose a housekeeping service to be performed while the user is out.

In addition, in cases where the behavior thus determined is "commuting to home (homeward)", it is estimated that the user will return home after a predetermined period of time. In this case, in order for the user to receive a package scheduled to arrive at home, a delivery time frame designation service for the package can be guided to the user.

In this manner, the proposal generation unit 1023 may estimate a time frame in which the user is at home or a time frame in which the user is absent, and may propose a service based on a result of the estimation.

Here, the service is proposed based on "whether or not the user is at home", but the service may be proposed based on other criteria. For example, the location of a moving user may be estimated, and a service according to the location may be proposed. This makes it possible to, for example, "notify the user that a restaurant on a commuting route is currently available and propose to take dinner".

In cases where it is determined in step S33 that there is a service that can be proposed (step S34—Yes), the processing proceeds to step S35, where proposal data is generated. The proposal data may include a method of accessing the provider of the service (e.g., a URL for a redelivery application when a delivery service is used). The proposal data is transmitted to the mobile device 200, and then provided to the user via the proposal receiving unit 2023.

Here, note that if the user agrees, data for applying for the service (e.g., a redelivery request) may be generated and transmitted to the service provider.

As described above, the system according to the first embodiment estimates the behavior of a user based on an action performed on a locking and unlocking device 300 by the user, and proposes a service for which the user is a beneficiary. According to such a configuration, it becomes possible to propose the service that is beneficial to the user without the user taking any particular action, thereby improving the convenience of the user.

Here, note that in the first embodiment, a service is proposed to a user, but in the case where there is a previous consent of the user, proposal data may be transmitted to a company designated by the user. For example, a proposal to the effect that "the user is likely to return home after one hour, so that redelivery should be performed thereafter" or a proposal to the effect that "the user is likely to return home soon, so that redelivery should be performed immediately" may be generated and transmitted to a device managed by the delivery company.

Second Embodiment

In the first embodiment, the current behavior of a user is estimated based on collected result data. That is, a proposal has been generated based on the real-time behavior of the user.

On the other hand, a second embodiment is an embodiment in which future behavior of a user is predicted based on the result data that has been accumulated, and a service is proposed to the user based on the behavior thus predicted.

Figure 9:
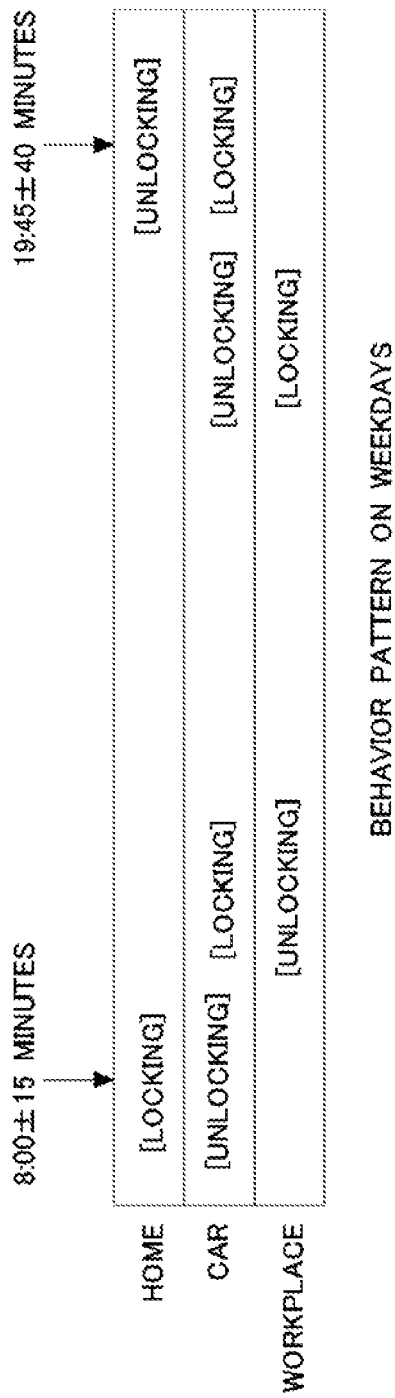
FIG. 9 is a diagram illustrating an example of patterned behavior taken by a user.

FIG. 9 illustrates an example of the behavior that a user can take on weekdays. In cases where the user goes back and forth between home and work by car, the behavior as illustrated in the figure is observed. In this way, in the case where the behavior taken by the user is patterned to some extent, there may be a case where subsequent behavior can be predicted at a stage where a part of result data is obtained. For example, when the user's home is locked at around 8 o'clock in the morning on weekdays, it is estimated that the user will go to work (that is, does not come home until night).

Figure 10:
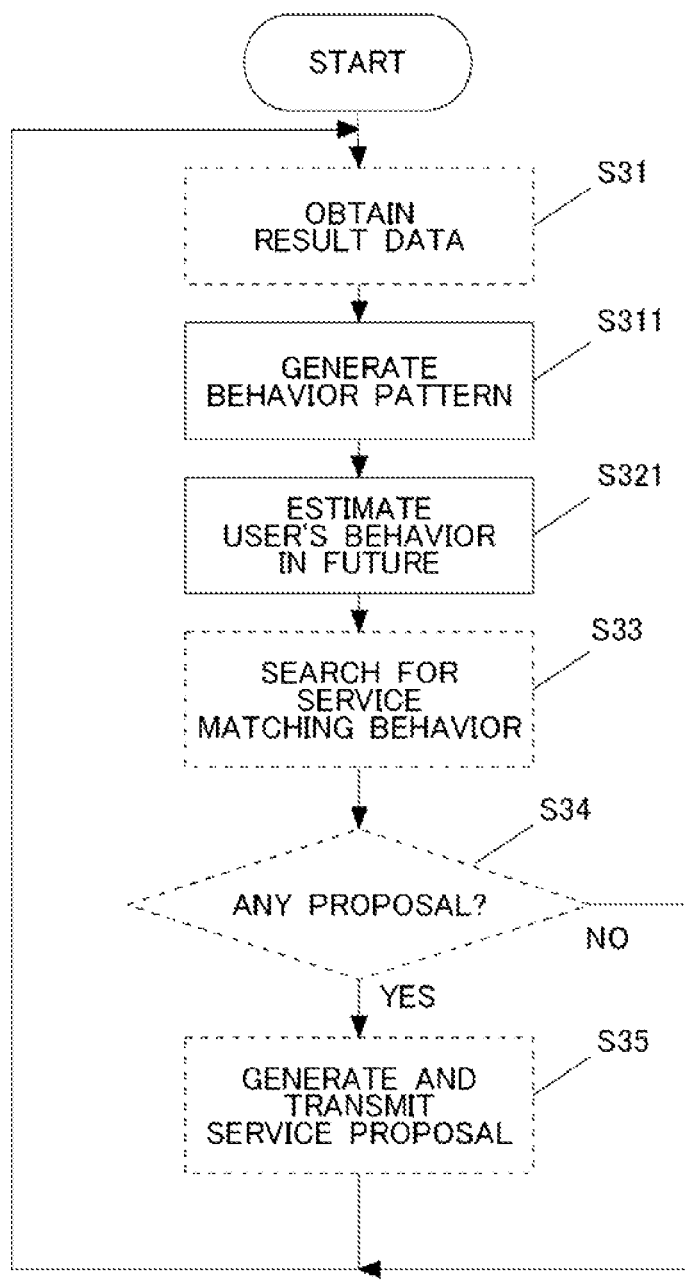
FIG. 10 is a flowchart of processing to be performed by a proposal generation unit in a second embodiment of the present invention.

FIG. 10 is a flowchart of processing performed by the proposal generation unit 1023 in the second embodiment.

In the second embodiment, in step S311, the proposal generation unit 1023 generates a behavior pattern based on the collected result data.

For example, a set of daily result data can be clustered, and based on the clusters thus generated, a plurality of typical behavior patterns (e.g., a behavior pattern corresponding to weekdays, a behavior pattern corresponding to Saturday, and the like) can be generated.

In step S321, the behavior of the user that will occur in the future is estimated based on the generated behavior pattern.

For example, when the result data "Home was locked, and then car was unlocked" occurred at 8:00 a.m., it can be determined that this behavior pattern matches the behavior pattern on weekdays.

In this case, it can be determined that the user will be away from home at least from 8:00 to 19:06. Also, it can be determined that the user will be home at 20:25 at the latest.

The processing after step S33 is the same as in the first embodiment.

In the second embodiment, it is thus possible to predict the behavior of the user based on the result data occurred in the past, and to generate a proposal for a service based on the predicted behavior.

In the second embodiment, too, the proposal may be transmitted to the portable terminal 200 carried by the user, or may be transmitted to the service provider. For example, a proposal may be generated to the effect that "There is a high possibility that the user will be out in 4 hours, and hence, a package will be delivered by then", and data of the proposal may be transmitted to the device managed by the delivery company.

(Modification)

The above-described embodiments are merely examples, and the present invention can be appropriately modified and implemented within a range not departing from the gist thereof.

For example, the processings, units, devices and the like explained in this disclosure can be implemented in various combinations thereof, as long as technical inconsistency does not occur.

Here, note that in the description of the embodiments, result data is obtained from the portable terminal 200, but in cases where a locking and unlocking device 300 is connected to a network, the locking and unlocking device 300 may generate result data, and transmit it to the server device 100.

In addition, in the first embodiment, a service suitable for each of the cases where the user is at home and the user is not at home is exemplified, but services other than the exemplified ones may be proposed as long as they are based on the location of the user.

Moreover, in the description of the embodiments, the server device 100 generates authentication information, but a part or all of authentication information may be generated by another device. For example, a case is considered where a part or some of locking and unlocking devices 300 are operated by another company. For example, a certain locking and unlocking device 300 may be a home delivery locker that is independently operated by a transportation company. In addition, the locking and unlocking device 300 may be a gate of an unmanned convenience store. In such a case, authentication information for locking and unlocking may be generated by a device managed by a company (a delivery company or a store operator).

Further, in the description of the embodiments, the locking and unlocking device 300 transmits and receives authentication information to and from the portable terminal 200 in order to perform authentication, but the authentication information may be a password or the like. Also, the authentication information may be biological information or the like.

Even in these cases, the aforementioned effects can be achieved if the server device 100 is able to obtain result data indicating the fact that the portable terminal 200 has performed an action on the locking and unlocking device 300 and that locking and unlocking have been performed as a result of the behavior. Here, note that in cases where a target locking and unlocking device 300 is not under the management of the system, information (location information) indicating a place where the locking and unlocking device 300 is installed may be included in the result data.

In addition, in the second embodiment, it is determined whether or not the generated result data matches a predetermined behavior pattern, but it can be used for detecting that the behavior of a user deviates from a predetermined behavior pattern. This makes it possible to convert the exemplified system to, for example, a system for watching over the elderly.

In this case, a behavior pattern can be obtained by installing one or more locking and unlocking devices 300 in the user's home (e.g., in a restroom or the like).

In addition, the processing described as being performed by a single device or unit may be shared and performed by a plurality of devices or units. Alternatively, the processing described as being performed by different devices or units may be performed by a single device or unit. In a computer system, it is possible to flexibly change the hardware configuration (server configuration) that can achieve each function of the computer system.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, any type of medium suitable for storing electronic commands.

What is claimed is:

1. An information processing apparatus including a control unit configured to:
    obtain result data indicating a result of locking and unlocking performed by one or more locking and unlocking devices that perform locking and unlocking based on authentication information obtained from a portable terminal carried by a user;
    generate, based on the result data, a behavior pattern of the user;
    estimate, based on the behavior pattern, a future time when the user will return home;
    generate proposal data including a proposal for delivering a package to the user after the future time; and
    transmit the proposal data to the user and to a device of a designated company providing delivery services.

2. The information processing apparatus according to claim 1, wherein
    the control unit obtains the result data for each of the locking and unlocking devices installed at a plurality of locations.

3. The information processing apparatus according to claim 1, wherein
    the control unit transmits the authentication information corresponding to the one or more locking and unlocking devices to the portable terminal.

4. The information processing apparatus according to claim 3, wherein
    the result data is generated by the portable terminal when the authentication information is used.

5. The information processing apparatus according to claim 1, wherein
    the control unit determines, based on the result data, whether or not the user is at home, and decides a content of the proposal based on a result of the determination.

6. The information processing apparatus according to claim 1, further including:
    a storage unit configured to store information on geographical locations of a plurality of the locking and unlocking devices;
    wherein the control unit estimates a current location of the user based on the geographical locations of the plurality of locking and unlocking devices, and decides a content of the proposal in accordance with the current location of the user.

7. An information processing method comprising:
    obtaining result data indicating a result of locking and unlocking performed by one or more locking and unlocking devices that perform locking and unlocking based on authentication information obtained from a portable terminal carried by a user;
    generating, based on the result data, a behavior pattern of the user;
    estimating, based on the behavior pattern, a future time when the user will return home;
    generating proposal data including a proposal for delivering a package to the user after the future time; and
    transmitting the proposal data to the user and to a device of a designated company providing delivery services.

8. The information processing method according to claim 7, wherein
    the result data is obtained for each of the locking and unlocking devices installed at a plurality of locations.

9. The information processing method according to claim 7, further comprising:
    transmitting the authentication information corresponding to the one or more locking and unlocking devices to the portable terminal.

10. The information processing method according to claim 9, wherein
    the result data is generated based on a history of use of the authentication information transmitted to the portable terminal.

11. A non-transitory storage medium storing a program for causing a computer to perform the information processing method according to claim 7.

* * * * *